United States Patent
Coon et al.

(10) Patent No.: US 7,213,836 B2
(45) Date of Patent: May 8, 2007

(54) CURTAIN AIR BAG MODULE

(75) Inventors: Jeffery S. Coon, Sterling Heights, MI (US); Chang-Hwan Ju, Rochester, MI (US); Prabhakar Padiyar, Sterling Heights, MI (US); Kenneth D. Moniaci, Royal Oak, MI (US)

(73) Assignee: Key Safety Systems, Inc., Sterling Heigts, MI (US)

( * ) Notice: Subject to any disclaimer, the term of this patent is extended or adjusted under 35 U.S.C. 154(b) by 0 days.

(21) Appl. No.: 11/179,879

(22) Filed: Jul. 12, 2005

(65) Prior Publication Data

US 2006/0043704 A1 Mar. 2, 2006

Related U.S. Application Data

(60) Provisional application No. 60/604,418, filed on Aug. 25, 2004.

(51) Int. Cl.
*B60R 21/16* (2006.01)

(52) U.S. Cl. .................................................. 280/730.2

(58) Field of Classification Search ............. 280/730.2, 280/728.2, 729, 743.2, 743.1, 728.3
See application file for complete search history.

(56) References Cited

U.S. PATENT DOCUMENTS

| | | | |
|---|---|---|---|
| 6,170,860 B1 | 1/2001 | Denez et al. | |
| 6,199,898 B1 * | 3/2001 | Masuda et al. | 280/730.2 |
| 6,234,517 B1 * | 5/2001 | Miyahara et al. | 280/730.2 |
| 6,279,941 B1 * | 8/2001 | Nakajima et al. | 280/728.2 |
| 6,431,587 B1 * | 8/2002 | O'Docherty | 280/730.2 |
| 6,435,543 B1 * | 8/2002 | Magoteaux et al. | 280/730.2 |
| 6,460,877 B2 * | 10/2002 | Tanabe et al. | 280/729 |
| 6,962,364 B2 * | 11/2005 | Ju et al. | 280/730.2 |
| 6,974,152 B2 * | 12/2005 | Hanjono | 280/728.3 |
| 2003/0057683 A1 * | 3/2003 | Wipasuramonton et al. | 280/730.2 |
| 2004/0104561 A1 * | 6/2004 | Maertens | 280/730.2 |
| 2004/0178609 A1 * | 9/2004 | Totsuka et al. | 280/730.2 |
| 2005/0134025 A1 * | 6/2005 | Ridella et al. | 280/730.2 |

* cited by examiner

*Primary Examiner*—Faye M. Fleming
(74) *Attorney, Agent, or Firm*—Markell Seitzman

(57) ABSTRACT

A curtain air bag module (100) comprising an air bag (102) having at least one inflatable region with internally configured internal tethers, at least one of the internal tethers disposed at an angle to a stream of inflation gas. The air bag includes a distribution tube located proximate a top portion of the at least one inflatable region of the air bag, the tube having a first end adapted to receive inflation gas, the distribution tube including at least one set of openings proximate each of the at least one inflatable regions for communication of inflation gas to these regions, the at least one internal tether disposed at an oblique angle to the distribution tube.

10 Claims, 9 Drawing Sheets

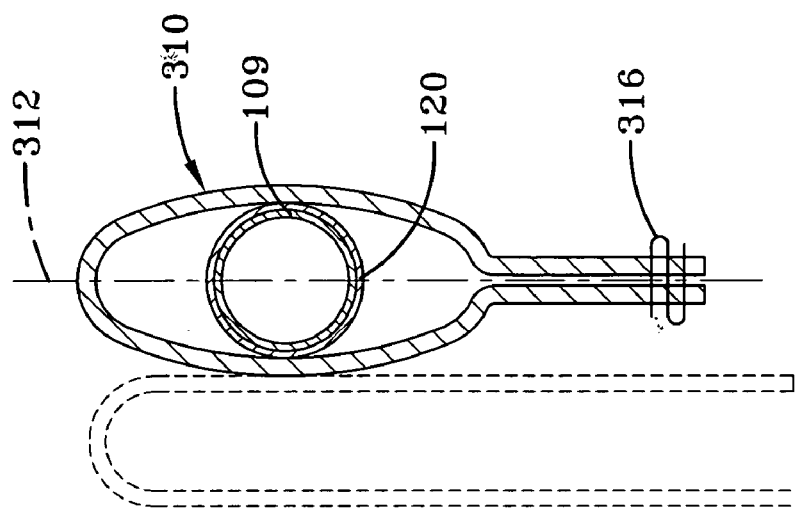
FIG-4
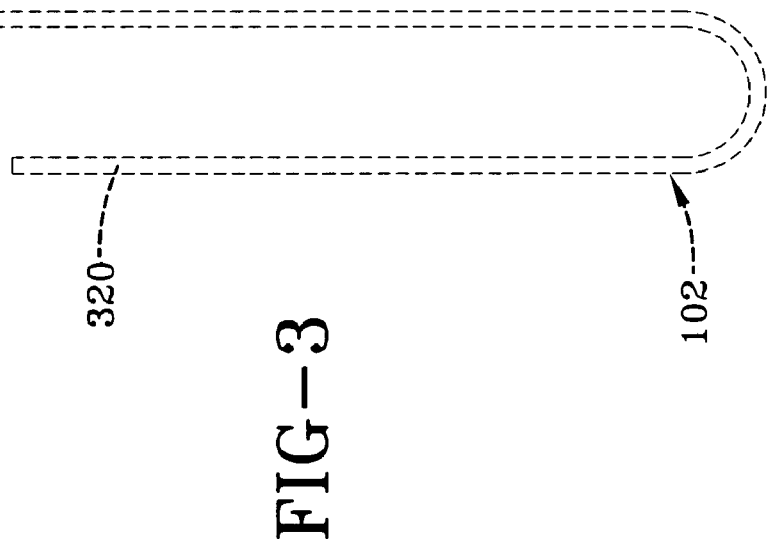
FIG-3
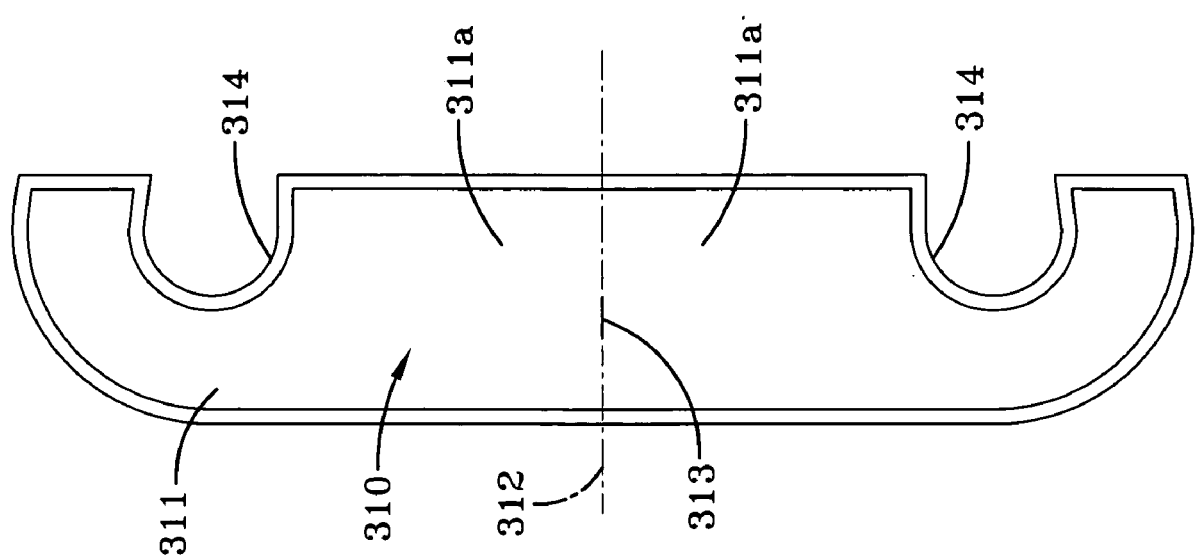

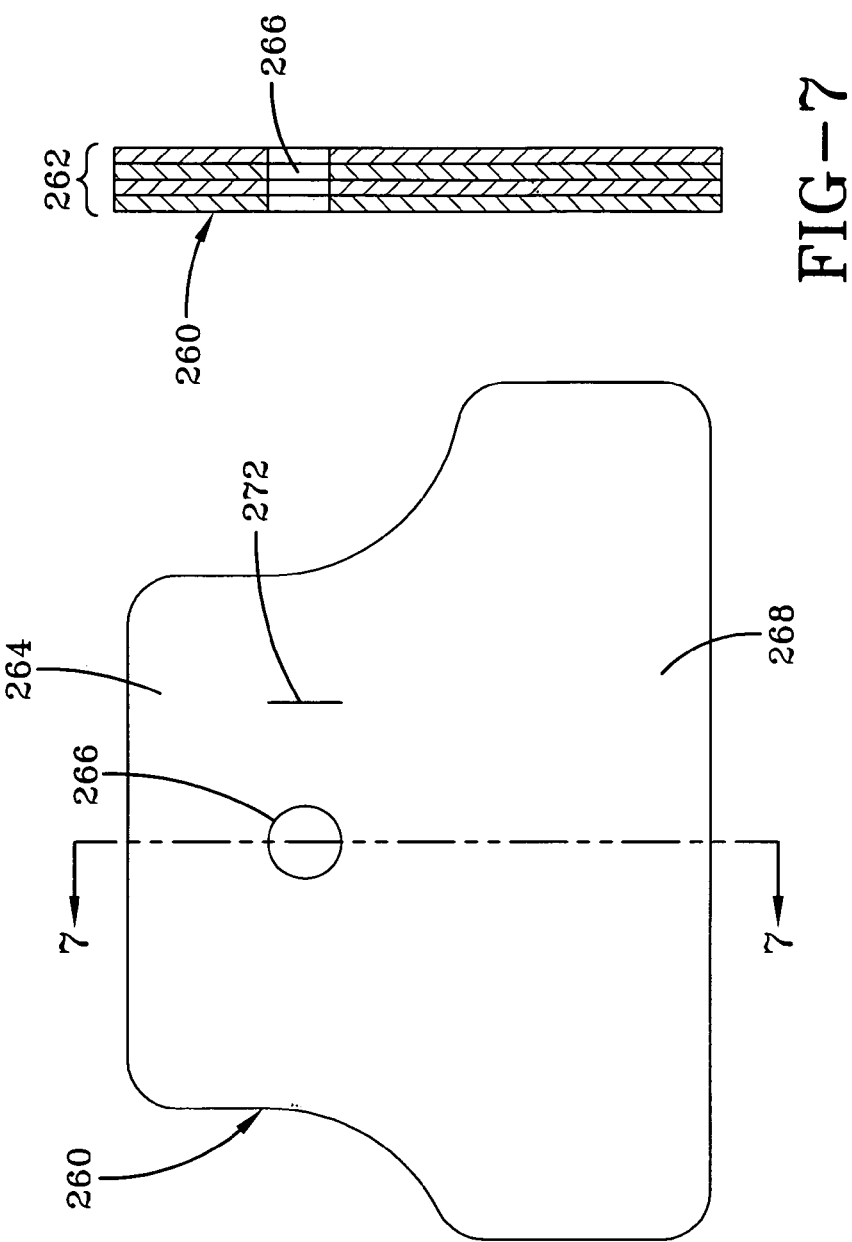
FIG-7
FIG-6
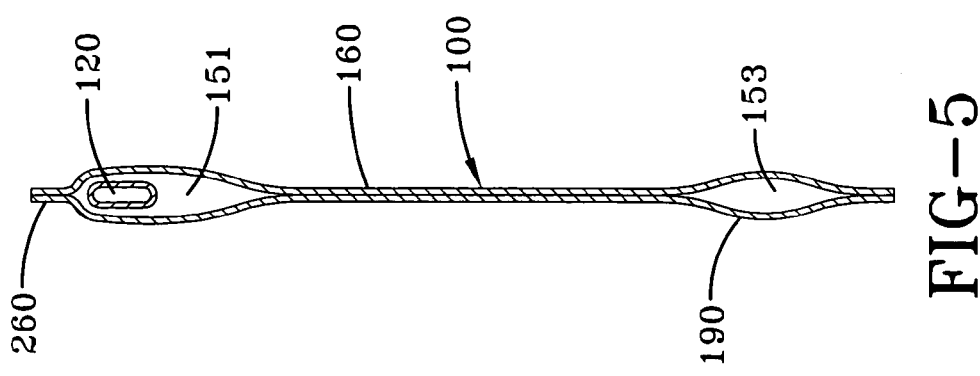
FIG-5

CURTAIN AIR BAG MODULE

This application claims the benefit of U.S. Provisional Application No. 60/604,418, filed on Aug. 25, 2004. The disclosure of the above application is incorporated herein by reference.

BACKGROUND AND SUMMARY OF THE INVENTION

The present invention generally relates to inflatable restraints for motor vehicles and more specifically to a curtain air bag installed along the roof rail of a vehicle.

Reference is briefly made to FIG. 1, which illustrates a prior art curtain air bag module 20 installed along the roof rail 22 of a passenger compartment 23 of a vehicle 24. In typical curtain air bag installations the air bag extends from the A-pillar 30 across the B-pillar 32 to the C-pillar 34 of the vehicle. Generally, the air bag module 20 comprises a rectangular or oblong air bag 40 folded or rolled into a cylindrical configuration. While in this compact configuration, the air bag is slid into a housing that can take many shapes; one such housing is a long cylindrical, perforated or breakable covering or sleeve, which maintains the air bag in its folded or rolled condition.

The air bag will generally include an inlet 42 in communication with an inflator 44. The inflator may be directly connected to the inlet or inserted within a housing for an indirect connection. In other installations the inlet is formed by an opening in an inflatable portion of the air bag and the inflator is inserted directly therein. The inflator and/or housing are appropriately fastened, using one or more fasteners or brackets 46, to the appropriate vehicle structure. As illustrated in FIG. 1, the inflator is mounted in the C-pillar, however, the inflator 44 can be mounted proximate the B or A-pillars. Further, as known in the art, the lower corners of the air bag are often secured to adjacent corresponding pillars by a strap, which is often called a tether. One forward strap 48 is shown in FIG. 1 in its stored configuration along the A-pillar. The various components shown in FIG. 1 are covered by one or more trim pieces (not shown) hiding them in normal use. As mentioned, the air bag module is typically secured to the roof rail by a plurality of fasteners, which secure the inflator and also secure the air bag. The module may also include a deflector or ramp 50 located proximate the B-pillar, which urges the air bag as it inflates to move away from the B-pillar.

It is an object of the present invention to provide an improved curtain air bag module.

Accordingly the invention comprises: a curtain air bag module comprising an air bag having at least one inflatable region with internally configured internal tethers, at least one of the internal tethers disposed at an angle to a stream of inflation gas, with other internal tethers placed near corners of the at least one inflatable region. The air bag includes a distribution tube located proximate a top portion of the at least one inflatable region of the air bag, the tube having a first end adapted to receive inflation gas, the distribution tube including at least one set of openings proximate each of the at least one inflatable regions for communication of inflation gas to these regions, the at least one internal tether disposed at an oblique angle to the distribution tube. The module further includes a plurality of tabs separately secured to a portion of the air bag and which extend from a hollow tubular covering about the air bag and are secured proximate the roof rail of the vehicle. In the illustrated embodiment, the air bag includes two major inflatable regions positioned laterally of each other with added passages interconnecting the major inflatable regions.

Many other objects and purposes of the invention will be clear from the following detailed description of the drawings.

BRIEF DESCRIPTION OF THE DRAWINGS

FIG. 3 illustrates the construction of the neck of the air bag.

FIG. 4 shows the construction of the neck and neck reinforcement portion of the air bag and also shows a distribution tube located in the neck portion.

FIG. 5 is a cross-sectional view taken through section 5—5 of FIG. 2.

FIGS. 6 and 7 illustrate details of connecting or mounting tabs of the air bag.

DETAILED DESCRIPTION OF THE DRAWINGS

Figure 2:
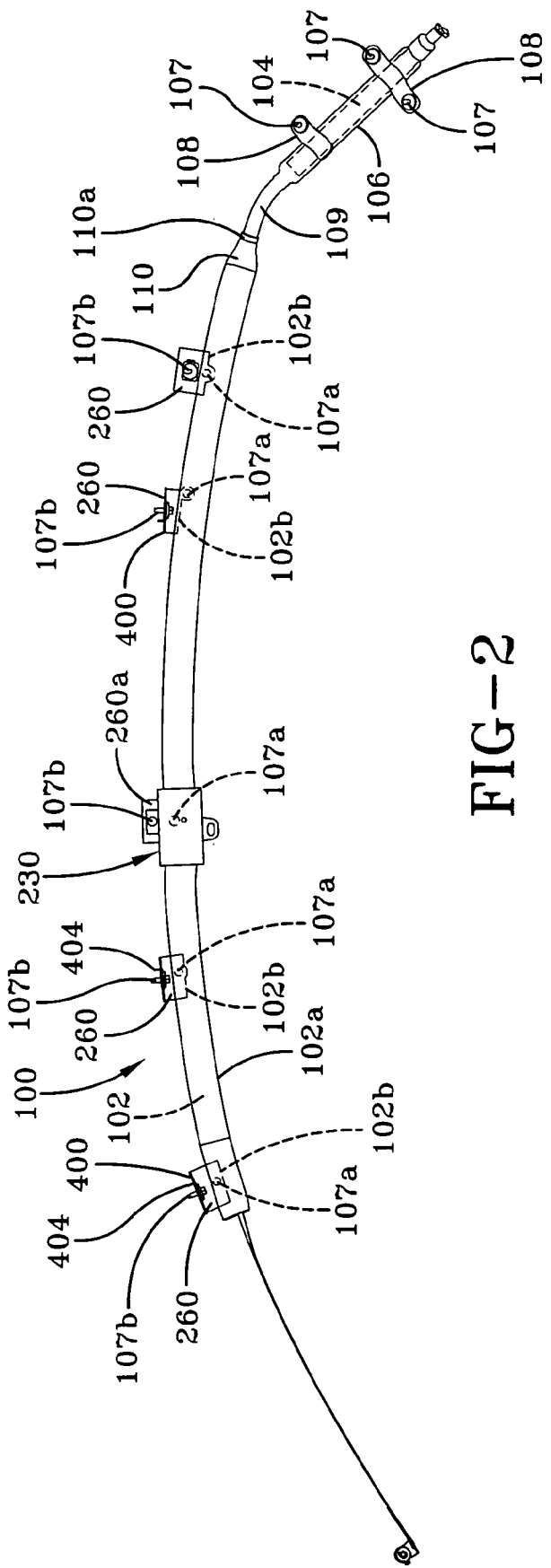
FIG. 2 shows many of the components of a curtain air bag module according to the current invention.

The present invention comprises an air bag module 100 (see FIG. 2) comprising an air bag 102 (shown in a folded state), an inflator 104 mounted within a hollow, tubular housing 106; the housing 106 is secured to the C-pillar 34 such as by threaded fasteners 107 received through mating connectors or brackets 108 that are formed as part of the housing. The housing 106 or housing function can be as simple as the brackets themselves or, for example, the housing can be a cylindrical tube configured to receive a cylindrical inflator. The air bag is shown in FIG. 2 in its stored configuration and in an inflated condition in FIG. 2a. In the stored configuration the air bag is covered with a thin, long tearable covering 102a, which is generally known in the art. The covering 102a is configured to also hold another plurality of the fasteners 107a, such as plastic push pins received through like plurality of openings in the rear side of the covering as shown in FIG. 2. These fasteners 107a extend out rearward from the covering 102a. During installation of the module onto the roof rail, the module is initially aligned to the roof rail and the fasteners 107a pushed into openings in the roof rail thereby providing a first step in the mounting of the module. Subsequently, with the module 100 generally in place, the module is further secured to the roof rail by another set of fasteners 107b. As will be described below, these fasteners 107b extend through flaps 260 of the air bag 102 and through an anti-rotation member 400.

The air bag 102 includes a region communicated with the inflator; this region is generally referred to as a neck or neck portion 110 and can take many shapes. In the illustrated embodiment, the neck or neck portion 110 is in operative communication with an extension tube 109 (see FIG. 2) of the housing. Alternately, the neck is connected directly about the inflator if a housing is not used.

It is virtually impossible in this type of configuration to have the neck of the air bag to lie flat, since the inflator 104 or tube 109 causes the neck to take a circular profile (in cross-section). The air bag 102 further includes, proximate the neck 110, a reinforcement panel 310 (see FIGS. 2a and 3) which is fitted about the exterior of the air bag to provide additional strength to the neck 110, as well as to provide an added fabric layer which protects the neck portion 110 from damage. The panel 310 is shown in FIG. 3 and includes an oblong body 311 with opposing halves 311a located about a centerline 312. At least one slot 313 is formed along the centerline 312. The body includes opposing symmetrically positioned notches 314. The panel 310 is folded over the centerline 312 to achieve the general shape shown in FIG. 2a.

Figure 2A:
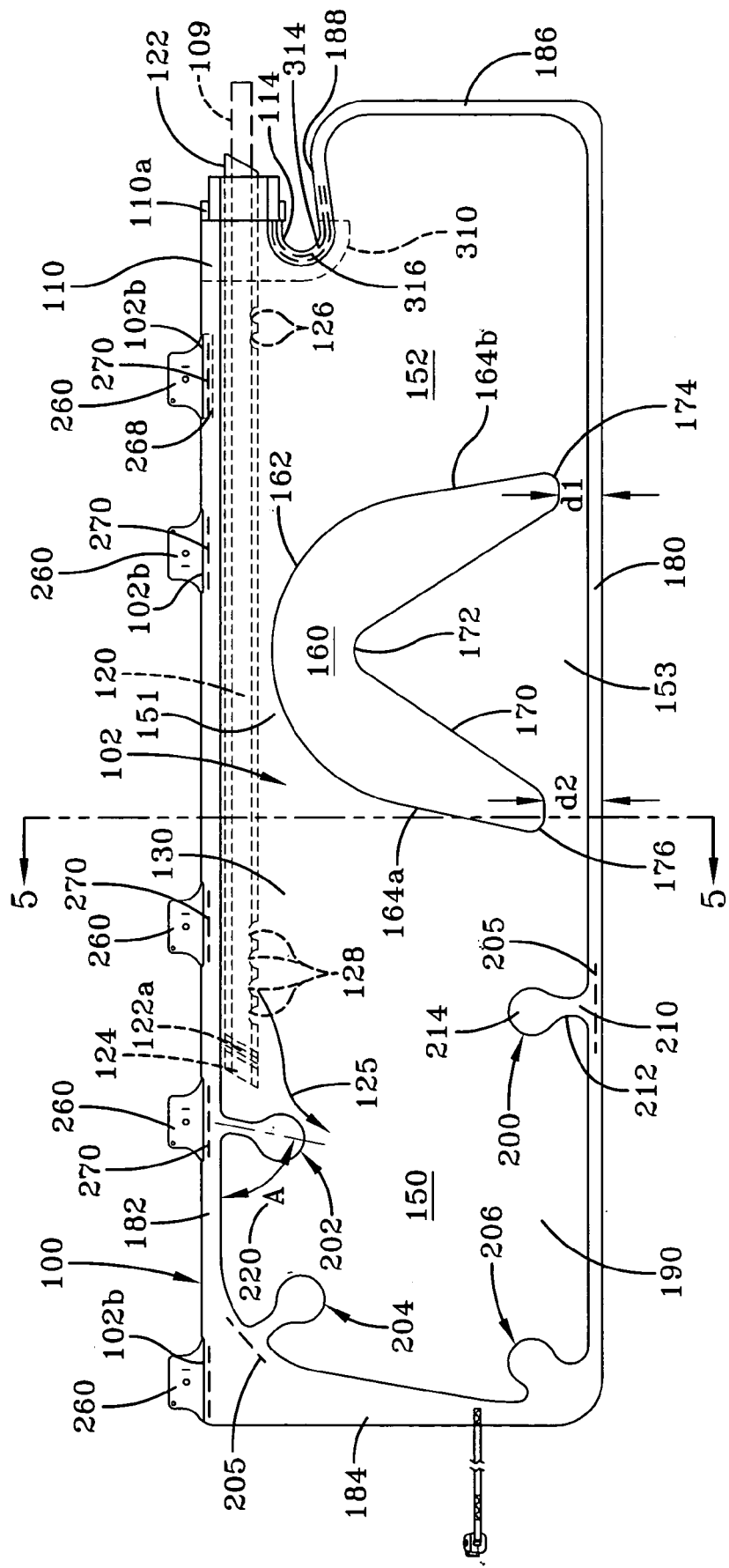
FIG. 2a shows the air bag in an inflated configuration.

The notches 314 are aligned with similarly shaped notches 114 formed in the neck 110. The neck panel 310 is sewn to the air bag at a seam 316, which secures each panel half 311a to opposite sides of the neck 110. The neck 110, neck panel (and a distribution tube discussed below) are secured about distribution tube 109 by a circular hoop or ring-type fastener 110a as shown in FIGS. 2 and 2a. Reference is made to FIG. 4, which shows the neck 110 in cross-section and also shows other portions 320 (in phantom line) of the air bag 102 folded and closely positioned to the neck in relative placement these other portions would take in the stored configuration of the air bag (the covering 102a is not shown). As can be appreciated, the panel 310 prevents these other portions 320 of the air bag 102 from rubbing against the material forming the neck 110 as the air bag inflates.

The air bag 102 further includes a distribution tube 120. The distribution tube is inserted within the neck 110 and positioned adjacent the upper side of the air bag. The distribution tube 120 has a first end 122 received within the neck and also positioned about the housing extension 109 and secured in a fluid-tight manner by the fastener 110a (see FIG. 2a). Tube 120 includes another end 124, which may be opened or, as illustrated, closed such as by stitches or staples 122a. The tube further includes a plurality of openings 126 positioned proximate the neck and a further plurality of openings 128 positioned proximate end 124 in communication with a respective chamber 152 and 150. In a preferred embodiment, the number of openings 126 is two, while the number of openings 128 is four. The reason for this construction is to distribute the inflatable gas into the air bag so the front and the rear of the curtain air bag fill uniformly and quickly at all operating temperatures.

The tube can be a solid, extruded metal tube or, alternatively, made from a dense, woven material. The above material choices are known in the art. As mentioned, the tube is received within the upper portion 130 of the air bag and can be held in place by a fastener such as a thin breakable wire or plastic strip or even a sewn stitch, collectively 122a, that extends through the tube and the various panels of the air bag to hold end 124 in place, while not appreciably restricting the dimension of the opened diameter of the distribution tube 120.

As mentioned, the air bag further includes a forward or first inflatable chamber 150 and a rear inflatable chamber 152. The chambers 150 and 152 communicate with each other via open regions on the air bag that form passages 151 and 153 linking the chambers. The passages 151 and 153 will also become inflated.

Positioned between chambers 150 and 152 is an optional non-inflatable region 160. The non-inflatable region includes an arcuately shaped upper surface 162, typically shaped as a segment of a circle and two tangentially extending straight portions 164a and 164b to avoid unnecessary stress risers forming as the air bag inflates. The lower portion of the non-inflatable region is triangularly shaped as designated by reference line 170 having two descending lobes. The center 172 of the lower triangular shape is arcuately shaped. The non-inflatable portion includes first and second arcuately shaped ends 174 and 176. Each of the ends is spaced a predetermined distance d1 and d2 from the lower edge or seam 180 to reduce cushion stiffness from chamber 150 of the air bag 102. As illustrated in this embodiment of the invention, the distance d1 between end 174 and the lower edge 180 of the air bag is smaller than the distance d2 between end 176 and edge 180 of the air bag to balance air flow to the region below region 160.

The air bag includes an upper edge 182, as well as lateral edges 184 and 186, which together define the periphery of the air bag. Edge 186 includes a concave portion 188 that defines the elongated shape of the neck 110.

In general, the inflatable portions of the air bag are formed by a first and second, or inner 190 and outer 192 fabric or panel (or panel section). As illustrated in FIG. 2a, only the inner panel 190 is visible; the outer panel 192 is generally identical and shown in a number of the cross-sectional views, such as FIG. 5, which is a cross-sectional view through section 5—5 of FIG. 2a.

Certain regions of the inner and outer panels 190 and 192 such as regions 200, 202, 204, 206 of the forward chamber 150 are configured to have the inner and outer panels touch or be coextensive, integral, or commonly connected (depending upon the technique used to form the air bag). As can be seen, these commonly connected regions 200–206 each generally comprises a shoulder or base 210, a neck 212 and a head 214. The construction of regions 200 and 204 is substantially similar, as the shoulder, neck and head are generally the same size and these regions are situated perpendicular to an imaginary line 205 extending through the periphery of the air bag proximate the regions 200 and 204. Region 202 is substantially similar to regions 200 and 204, that is, it also has a neck substantially narrower than its corresponding head 214, however, the region 202 is oriented at an angle A relative to the local periphery of the air bag, which is designated by numeral 220. As can be seen from the figures, region 202 is the closest to the openings 128 in tube 120 and will be impacted by a relatively high velocity stream of inflation gas schematically shown by arrow 125. The angular orientation of region 202 lessens stress build-up in the adjacent portions of the air bag during air bag inflation.

The reason for introducing these interconnected regions 200, 202, 204, etc. in the air bag is they also serve to reduce the inflatable capacity of the air bag and selectively reduce the pressure generated within the material forming the air bag as it rapidly inflates. The region 206 is similar to the other regions 200–204 in that it includes a shoulder, neck and head portion; however, the width of the neck approximates that of the head. The reason for this design is it reduces cushion volume while at the same time provides adequate occupant head protection at the lower front portions of the inflated air bag.

The air bag includes a plurality of tabs 260, which are shown in greater detail in FIGS. 6 and 7. Each tab is formed by a plurality of layers 262 of material, typically four pieces or panels of woven fabric. The layers, pieces or panels of woven material are laid on top of one another and subsequently all of the layers are simultaneously laser cut. The laser cutting melts the periphery of each piece and in essence forms a peripheral weld 264 connecting each of the layers together as an integral. The resulting construction is a tab 260 having increased strength. A mounting opening 266 is formed within the tab by laser or die cutting. The lower edge 268 of the tab is sewn to the top portion 182 of the air bag by one or more lines of stitching 270. After the air bag 102 is fitted within the covering 102*a*, each tab 260 is pulled out of the covering through a slit 102*b*.

Figure 1:
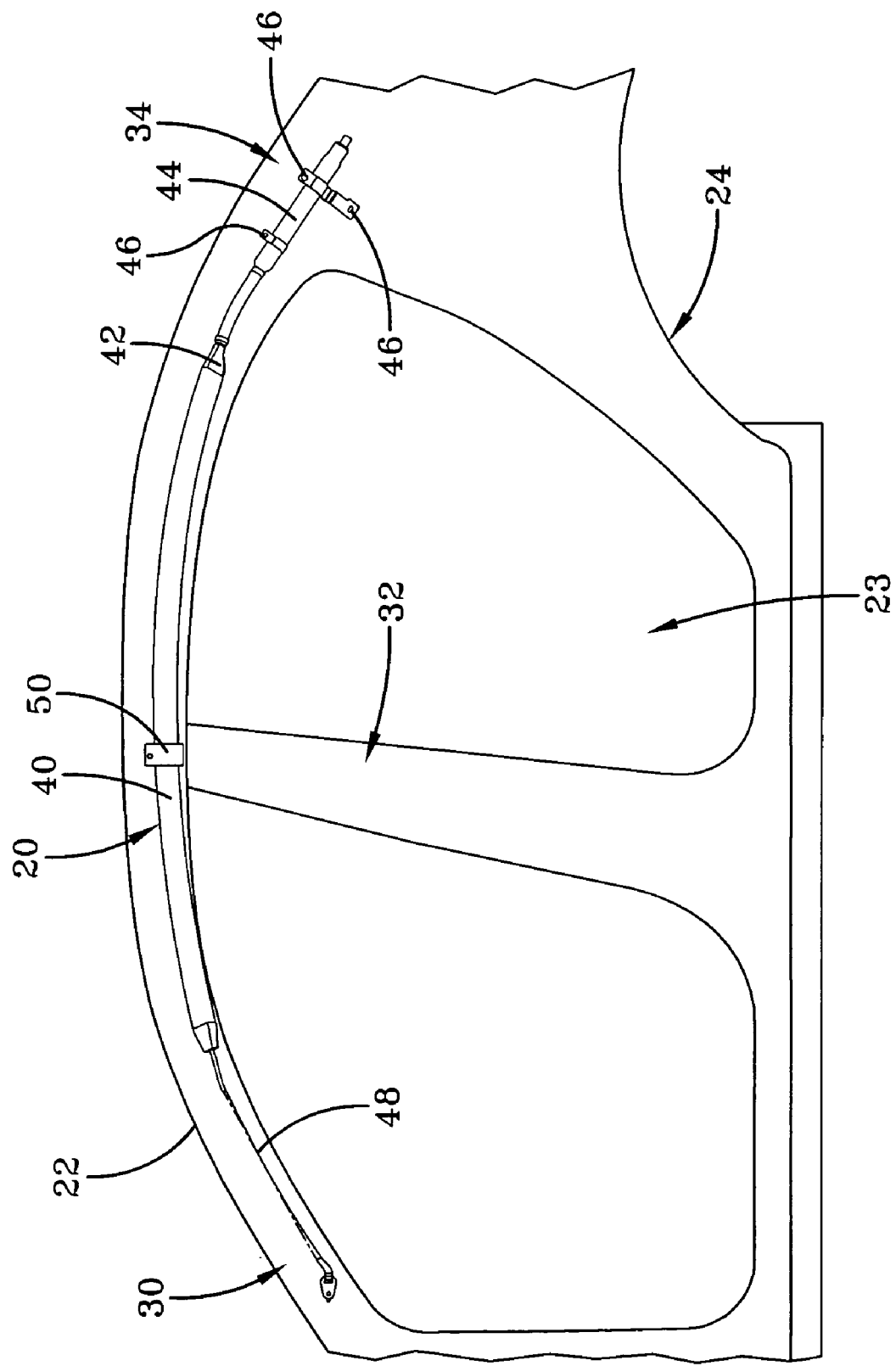
FIG. 1 illustrates a typical mounting relationship of a curtain air bag module within a vehicle's passenger compartment.

Reference is briefly made to FIG. 1. As can be seen, a center portion of the prior art curtain generally extends across the B-pillar; this is the case with the present invention. Typically this B-pillar also supports an anchor point called a D-ring of a seat belt system (not shown). In addition, various plastic trim parts (not shown) are attached to the metal under-structure forming the B-pillar. It is desirable to include within the air bag module a diversion mechanism, which acts as a deflector or ramp to urge the air bag, as it inflates, to move away from any potential obstructions formed on or by the B-pillar such as the D-ring and trim parts. The concept of utilizing such a ramp has been previously proposed in the art. The present invention utilizes a new and improved holding and ramp mechanism illustrated in FIGS. 8–11.

Reference is briefly made to FIGS. 8–11, which illustrate the details of a B-pillar ramp or deflector 230 according to the present invention. The deflector 230 is generally U-shaped having flexible walls such as an outside wall 232 and inside wall 234, each with openings 232*a* and 234*a* and a double or reinforced bottom 233 defined by two parallel walls. The deflector is typically made of an extruded plastic, which provides the deflector 230 with its desired flexibility. Each individual deflector 230 is stamped or cut from a longer extruded component or part. Side or outside wall 232 terminates in an end 235 having a fastening opening 236. Side or inside wall 234 is also mounted to the roof rail via a fastener 107*a*, which extends from the air bag covering 102*a* through opening 234*a*. Side 234 includes a generally horizontally formed shoulder 240, which terminates in end 242 (facing end 235) having another mounting opening 244.

Figure 8:
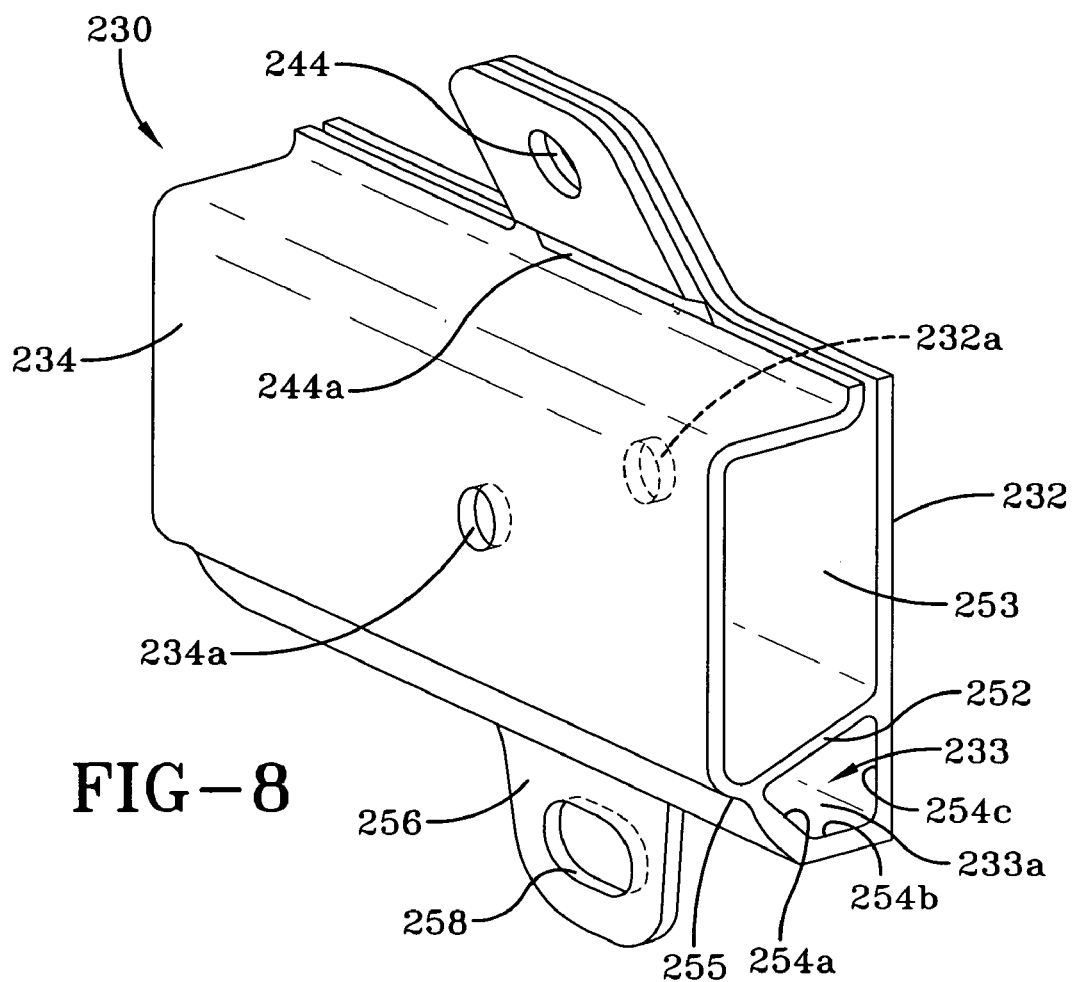
FIGS. 8, 9 and 10 respectively illustrate an isometric view, a side view and a front view of a B-pillar ramp or deflector.
Figure 10:
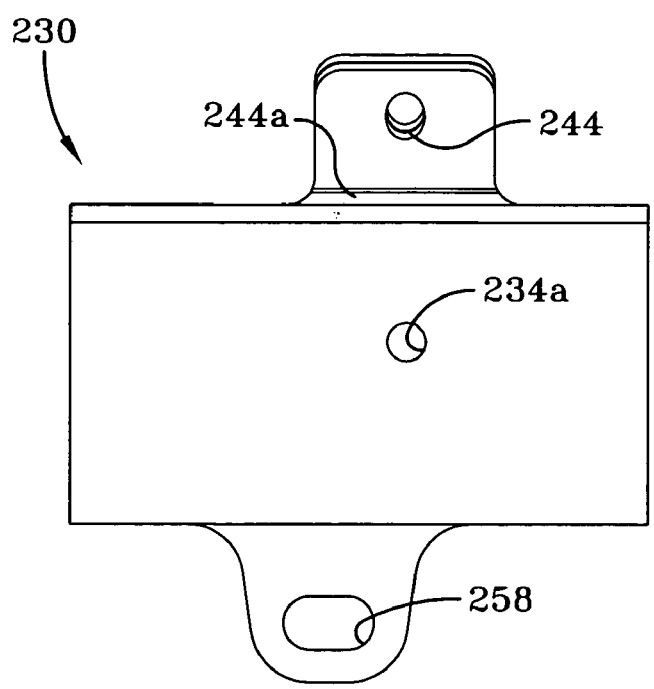
Figure 9:
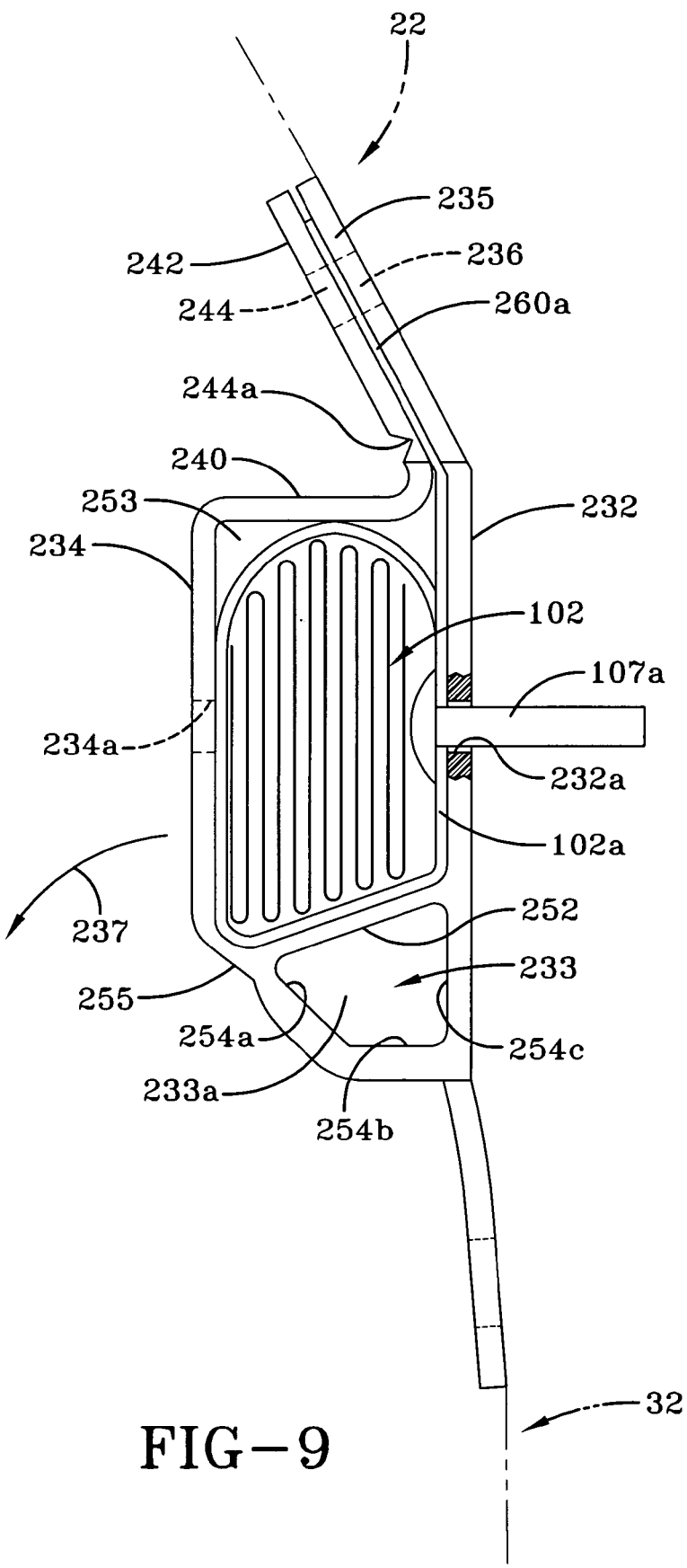
Figure 11:
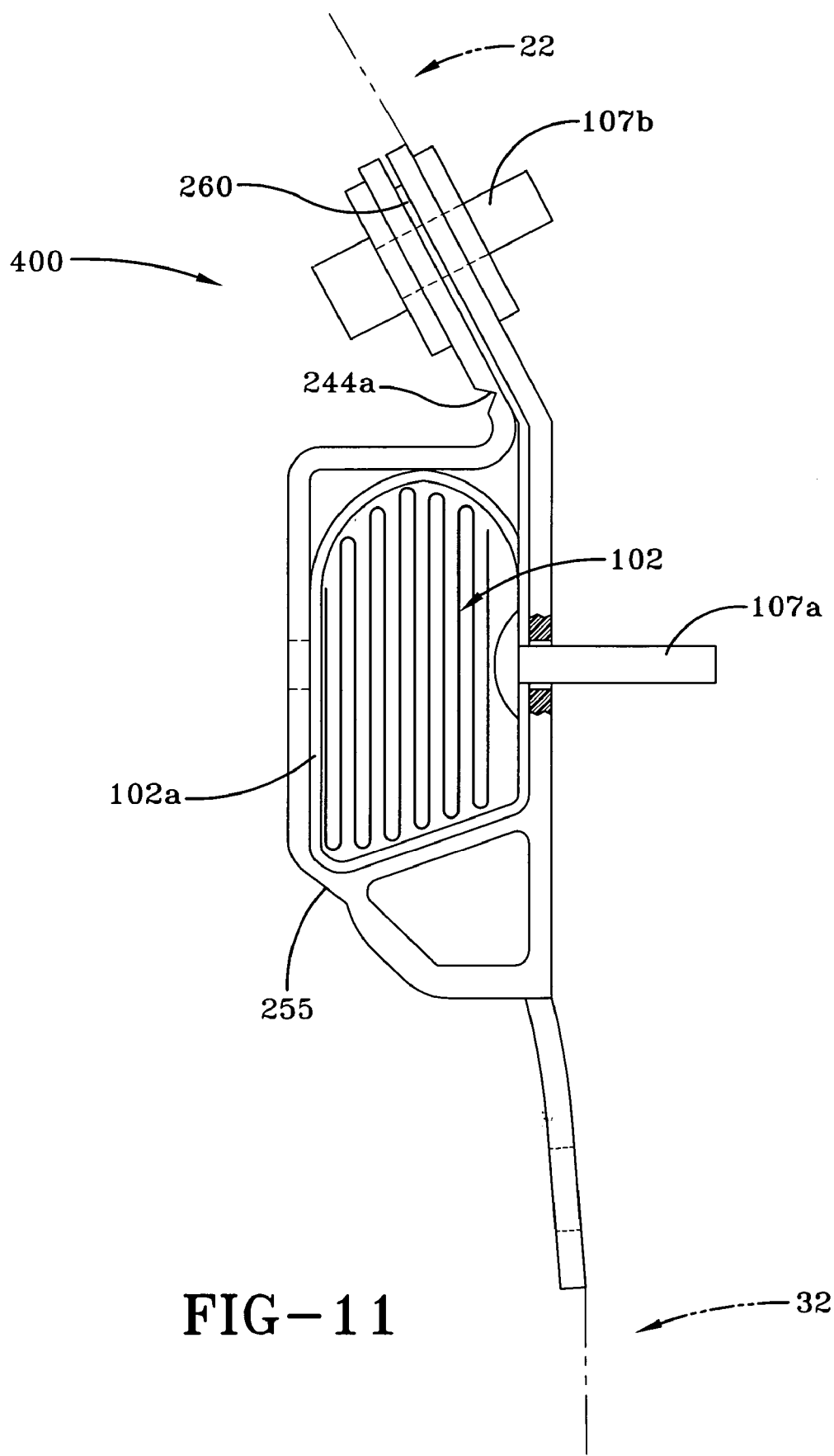
FIG. 11 shows a cross-sectional view of the B-pillar ramp.

As will be seen, one tab 260 is placed between ends 235 and 242. FIGS. 2, 8 and 11 illustrate the deflector 230 in its mounted configuration with ends 235 and 242 registered to each. A mounting bolt 107*b* extends through openings 234*a* and 236. As can be seen in FIG. 9, one of the tabs such as 260*a* of the air bag extends between the ends 235 and 242; and the bolt 107*b* extends through the mounting openings in both ends and in tab 260*a*. The deflector further includes a lower mounting arm 256, below the bottom 233, having an opening 258 therein. The lower mounting arm 256 is secured to the B-pillar (or lower portion of the roof rail) by insertion of another fastener not shown) through opening 258.

The deflector includes the double bottom 233, which is formed as a tube 233*a* having a cross-section in the form of a four-sided polygon, an upper side 252 of which forms a bottom surface and also, in combination with sides 232 and 234, forms a cavity or chamber 253 for receipt of the air bag. The remaining sides 254*a, b* and *c*, in cooperation with upper side 252, form a tube 233*a*, which provides for increased stiffness in the part.

The above construction permits the lower portions of the deflector to stay intact during inflation of the air bag and to provide an edge 255, forming a hinge (at the intersection of side 234 and upper side 252 of the bottom) for side 234 of the deflector to rotate about after the tear seam is broken. The above-mentioned edge is located on an inboard side of the deflector and assists in directing the inflating air bag away from the B-pillar or B-pillar trim 32*a*, if used.

As the bag opens it expands and moves the deflector wall 234 outwardly in the direction of arrow 237. The deflector 230 tears along a tear seam 244*a*. After the ramp 230 has rotated downwardly, it will be placed between the B-pillar trim and the inflating air bag. The deflector 230 essentially operates as a ramp, urging or deflecting the inflating air bag away from obstructions on the B-pillar that might prevent the air bag from fully extending or which might slow the inflation of the air bag due to, for example, rubbing friction between the air bag and those obstructions. It should be noted that the folded air bag 102 enclosed within its cylindrical casing or covering 102*a* is also shown in FIG. 9.

In the preferred embodiment, the air bag 102 is integrally woven utilizing a Jacquard head and weaving process, which integrally forms the panels 190 and 192 and the peripheral edge of the air bag, as well as the non-inflated region and the commonly connected regions. As can be appreciated, the air bag can alternatively be manufactured by overlaying two substantially identical pieces of fabric and sewing them together to form the periphery and neck region, the non-inflated region and the neck region 110, and the commonly connected regions 200–206. Alternatively, and as known in the art, the air bag can be manufactured from one larger piece of fabric folded about its middle and sewn together along most if not all of its other common sides. In this construction, the folded-over portion of the larger panel forms the lower edge of the air bag without the need to weave or sew separate panels together.

Figure 12:
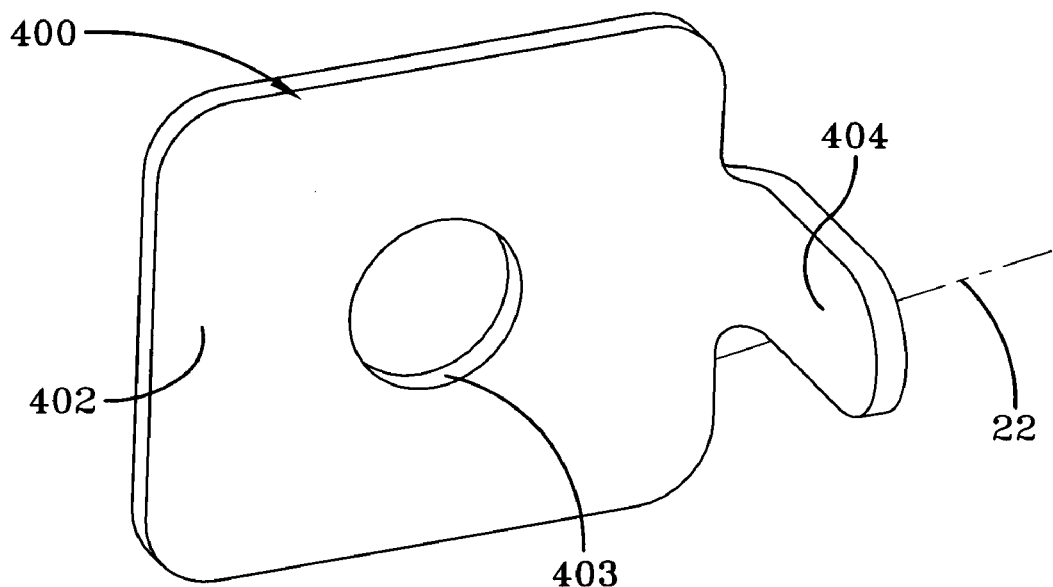
FIG. 12 shows an anti-rotation member used in conjunction with an air bag tab.
Figure 12A:
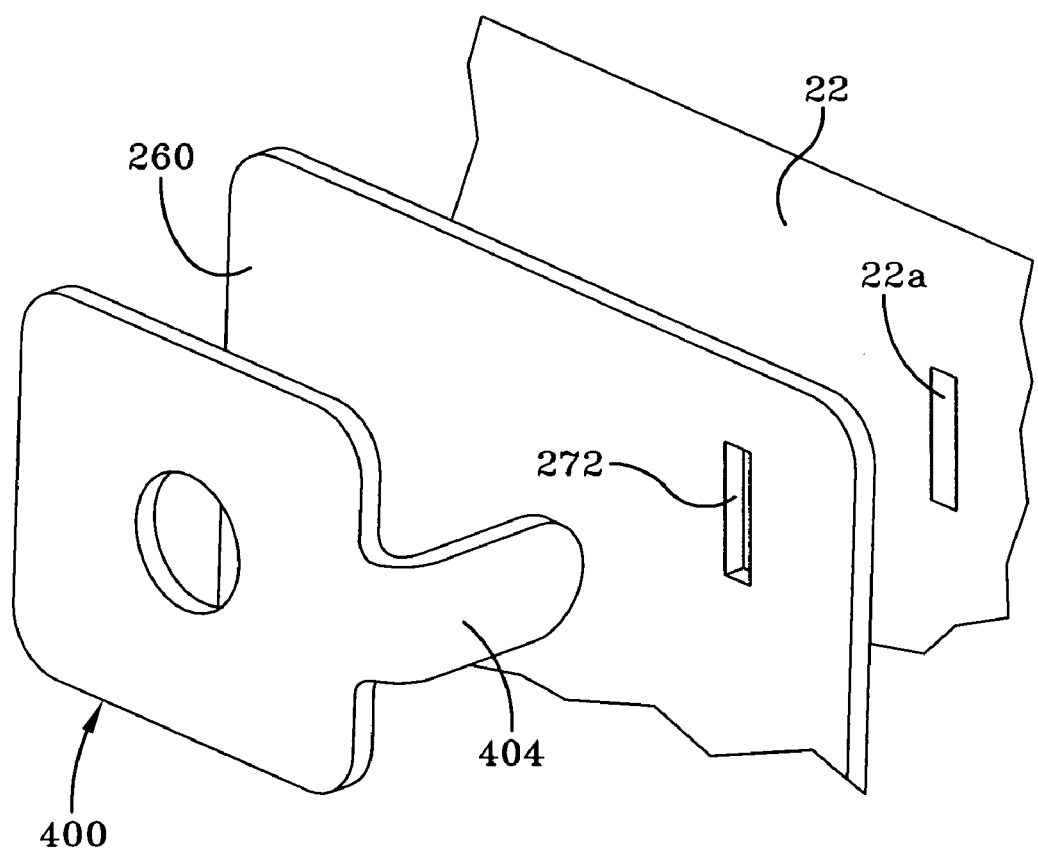
FIG. 12a is an exploded view showing the anti-rotation member positioned apart from a slot in a tab located near a slot in the vehicle.

Each fastener 107*b* is received within an anti-rotation member 400 (shown in FIGS. 11 and 12) that assists in mounting each tab 260 to lie flat against the roof rail and prevents each tab 260 (260*a*) from rotation. The anti-rotation member 400 includes a small plate 402 having an opening 403 therein for the fastener 107*b* and a projection or hook 404, which is pushed into a receiving slot 22*a* formed along the roof rail 22 of the vehicle. Each hook extends through a slot 272 in a corresponding tab 260. Each member 400 is aligned to a respective tab 260 and the fastener 107*b* inserted therethrough. The combination of the fastener 107*b* and hook 404 keeps each air bag tab 260 in place.

Many changes and modifications in the above-described embodiment of the invention can, of course, be carried out without departing from the scope thereof. Accordingly, that scope is intended to be limited only by the scope of the appended claims.

The invention claimed is:

1. A curtain air bag module for protecting occupants of a vehicle, the module comprising an air bag having opposing panels of material with a generally enclosed perimeter and forward and rear inflatable regions within the perimeter, a distribution tube located proximate a top of the enclosed perimeter and generally above each of the inflatable regions, the tube having a first end adapted to receive inflation gas and a first set and a second set of openings for communicating inflation gas to each of the forward and rear inflatable region, the second set of openings located proximate an end of the distribution tube and above the forward inflatable region, the distribution tube configured so that a stream of inflation gas exiting the second set of openings is at an angle to the tube, the air bag having a plurality of interconnected regions linking the opposing panels together at various locations throughout the air bag, one of these interconnected regions extending from a top portion of the periphery of the air bag, proximate an end of the distribution tube and partially extending into the forward inflatable region sufficient to intercept the stream of inflation gas, the one interconnected region disposed at an angle to a stream of inflation gas and to the top of the perimeter of the air bag.

2. A curtain air bag module for protecting occupants of a vehicle, the module comprising an air bag having opposing panels of material with a generally enclosed perimeter and forward and rear inflatable regions within the perimeter, a distribution tube located proximate a top of the enclosed perimeter and generally above each of the inflatable regions, the tube having a first end adapted to receive inflation gas and a first set and a second set of openings for communicating inflation gas to each of the forward and rear inflatable region, the second set of openings located proximate an end of the distribution tube and above the forward inflatable region, the distribution tube configured so that a stream of inflation gas exiting the second set of openings is at an angle to the tube, the air bag having a plurality of interconnected regions linking the opposing panels together at various locations throughout the air bag, one of these interconnected regions extending from a top portion of the periphery of the air bag, proximate an end of the distribution tube and partially extending into the forward inflatable region sufficient to intercept the stream of inflation gas, the one interconnected region disposed at an angle to a stream of inflation gas and to the top of the perimeter of the air bag;
including a neck portion (110) configured to communicate with the inflator via the tube, the neck portion located above a portion of the rear inflatable region, a portion of which extends rearward of the neck portion, the rear inflatable region, proximate a top portion thereof including a concavely shaped transition region connecting the neck portion with the top portion of the rear inflatable region, the air bag further including a neck panel disposed about the neck portion and the concavely shaped transition region, the neck panel configured to reinforce the neck portion and the transition region.

3. The air bag module as defined in claim 2 including a plurality of tabs extending from the top of the air bag, each tab insertable through a corresponding opening in a covering configured to be fitted about a folded air bag panel.

4. The air bag module as defined in claim 2 wherein the concavely shaped transition region is formed by opposing first and second concavely shaped curved regions in each of the opposing panels, wherein the neck panel includes oppositely positioned concave cutouts, each cutout portion overlaying each of the first and second concavely shaped curved region, the neck panel being sewn to the opposing panels to reinforce same.

5. A curtain air bag module for protecting occupants of a vehicle, the module comprising an air bag having opposing panels of material with a generally enclosed perimeter and forward and rear inflatable regions within the perimeter, a distribution tube located proximate a top of the enclosed perimeter and generally above each of the inflatable regions, the tube having a first end adapted to receive inflation gas and a first set and a second set of openings for communicating inflation gas to each of the forward and rear inflatable region, the second set of openings located proximate an end of the distribution tube and above the forward inflatable region, the distribution tube configured so that a stream of inflation gas exiting the second set of openings is at an angle to the tube, the air bag having a plurality of interconnected regions linking the opposing panels together at various locations throughout the air bag, one of these interconnected regions extending from a top portion of the periphery of the air bag, proximate an end of the distribution tube and partially extending into the forward inflatable region sufficient to intercept the stream of inflation gas, the one interconnected region disposed at an angle to a stream of inflation gas and to the top of the perimeter of the air bag;
a deflector mountable on a vehicle pillar, formed as a plastic extrusion, the deflector having first and second side walls, at least one of the first and second wall being movable from a first condition which defines a space to receive the air bag in its folded state to a second condition in which the side walls are separated from one another forming a ramp to guide the motion of the inflating air bag; and
wherein the deflector includes a frangible upper tubular portion and a lower tubular portion with side walls extending from the lower tubular portion, the side walls in combination with a top portion of the lower tubular portion forming the upper tubular portion, intersection of the upper portion of the lower tubular portion with the first side wall configured to form a hinge about which the one side wall can rotate upon breakage of a tear seam.

6. The air bag module as defined in claim 5 wherein the second side wall includes a flat portion and the first side wall is L-shaped.

7. The air bag module as defined in claim 6 wherein the first and second walls each include a respective mounting tab, the mounting tabs are configured to lie in an overlaid manner and wherein the hinge is formed at the intersection of the L-shaped portion of the first side wall and its mounting tab.

8. A curtain air bag module for protecting occupants of a vehicle, the module comprising an air bag having opposing panels of material with a generally enclosed perimeter and at least one inflatable region, the air bag when in a folded configuration located proximate a roof rail of the vehicle and above a center pillar and center pillar trim, the module including a deflector which envelops that portion of the air bag proximate the center pillar trim, the deflector having first and second side walls, at least one of the first and second wall being movable from a first condition which defines a space to receive the air bag in its folded state to a second condition in which the side walls are separated from one another forming a ramp to guide the motion of the inflating airbag;
wherein the deflector includes a frangible upper tubular portion and a lower tubular portion with side walls extending from the lower tubular portion, the side walls in combination with a top portion of the lower tubular portion forming the upper tubular portion, intersection of the upper portion of the lower tubular portion with the first side wall configured to form a hinge about which the one side wall can rotate upon breakage of a tear seam.

9. The air bag module as defined in claim 8 wherein the second side wall includes a flat portion and the first side wall is L-shaped.

10. The air bag module as defined in claim 9 wherein the first and second walls each include a respective mounting tab, the mounting tabs are configured to lie in an overlaid manner and wherein the hinge is formed at the intersection of the L-shaped portion of the first side wall and its mounting tab.

* * * * *